US012585639B1

(12) United States Patent
Eliyahu et al.

(10) Patent No.: US 12,585,639 B1
(45) Date of Patent: Mar. 24, 2026

(54) INPUT-OUTPUT TOKEN SAVINGS USING SMALL LANGUAGE MODELS

(71) Applicant: INTUIT INC., Mountain View, CA (US)

(72) Inventors: Natalie Bar Eliyahu, Tel Aviv (IL); Shon Mendelson, Tel Aviv (IL); Hadar Lackritz, Tel Aviv (IL); Gal Elgavish, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/193,166

(22) Filed: Apr. 29, 2025

(51) Int. Cl.
*G06F 16/242* (2019.01)
*G06F 40/40* (2020.01)

(52) U.S. Cl.
CPC ............ *G06F 16/242* (2019.01); *G06F 40/40* (2020.01)

(58) Field of Classification Search
CPC ...................................................... G06F 16/242
See application file for complete search history.

(56) References Cited

U.S. PATENT DOCUMENTS

| | | | |
|---|---|---|---|
| 2024/0070188 A1* | 2/2024 | Basu | G06F 16/24578 |
| 2024/0346254 A1* | 10/2024 | Liu | G06F 40/40 |
| 2025/0045336 A1* | 2/2025 | Gonsalves | G06F 40/166 |
| 2025/0077581 A1* | 3/2025 | Gupta | G06F 16/90324 |
| 2025/0124316 A1* | 4/2025 | Potharaju | G06N 7/01 |

OTHER PUBLICATIONS

Chen et al., "Improving Large Models with Small models: Lower Costs and Better Performance", arXiv:2406.15471v1 [cs. CL], Jun. 15, 2024, 11 pages.
Open AI, "API Pricing", https://openai.com/api/pricing/, retrieved Feb. 12, 2025, 10 pages.

* cited by examiner

*Primary Examiner* — Van H Oberly
(74) *Attorney, Agent, or Firm* — DLA PIPER LLP US

(57) ABSTRACT
At least one processor may receive a query, wherein processing the query comprises at least one easy task and at least one complicated task. The at least one processor may process the at least one easy task using a small language model (SLM), thereby obtaining at least one SLM processing result. The at least one processor may process the at least one complicated task using a large language model (LLM), thereby obtaining at least one LLM processing result. The at least one processor may generate a query response comprising at least a portion of the at least one SLM processing result and at least a portion of the at least one LLM processing result and output the query response.

18 Claims, 4 Drawing Sheets

302 – receive query

304 – perform first query processing task (SLM)

306 – perform second query processing task (LLM)

308 – perform third query processing task (SLM)

310 – perform fourth query processing task (LLM)

312 – perform fifth query processing task (SLM)

314 – output query response

INPUT-OUTPUT TOKEN SAVINGS USING SMALL LANGUAGE MODELS

BACKGROUND

Large Language Models (LLMs) are used in a wide variety of real-life applications. When LLMs are used in the real world, certain practical challenges and limitations can arise. One of the main obstacles to using LLMs in practical scenarios is the high cost associated with each LLM call. LLM costs are high in multiple senses of the term. For example, LLM providers charge for the service. Under the common pricing plan of paying per token, both input and output tokens are counted. For instance, the cost of 1 million input tokens for the latest GPT-4o model from OpenAl is $5. This cost can quickly skyrocket for applications that serve millions of daily users, such as an LLM-based chatbot. Likewise, using LLMs at this volume is very costly in terms of bandwidth use and latency experienced by users and computing systems interacting with the LLM. Thus, there is not only a high financial cost to using LLMs at high volume, but also multiple technical costs. Even when theoretical advantages provided by LLMs make their use appealing, practical integration of LLMs into real-world systems is often hampered and even avoided due to high financial, bandwidth, and latency costs.

BRIEF DESCRIPTIONS OF THE DRAWINGS

DETAILED DESCRIPTION OF SEVERAL EMBODIMENTS

Systems and methods described herein can improve the efficiency of real-world LLM use. For example, some embodiments described herein may use a sizable LLM as the central processing unit for language model query processing, while a smaller, more cost-effective (or even free) language model operates as a support language model. A small language model (SLM) may be used as the support language model, where in this context an SLM may be a model specifically designed and deployed as an SLM, a free (e.g., older, or open source) LLM that may be less sophisticated than the latest commercial LLMs, and/or any language model that can be deployed internally and therefore avoid bandwidth and cost considerations.

Systems and methods described herein may use the SLM to perform easy query processing tasks and the LLM to perform complicated query processing tasks. For example, the SLM may extract pertinent details that are required to address a given query. The LLM may output a brief response, which may subsequently be augmented by the SLM to furnish the user with a more detailed response. This solution enables using the "wisdom" of the sizable language model with the cost-effective model text generation ability. This can be contrasted with other approaches that may analyze a query and determine whether an SLM or an LLM should handle the entire response. Here, the SLM and LLM can be used in combination to handle any query without pre-analysis.

Figure 1:
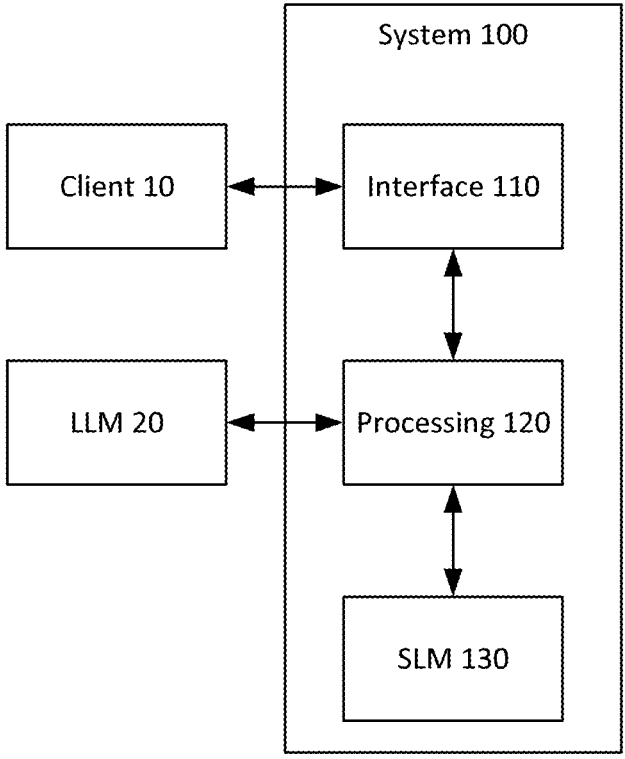
FIG. 1 shows an example query processing system according to some embodiments of the disclosure.

FIG. 1 shows an example query processing system 100 according to some embodiments of the disclosure. System 100 may include one or more modules, such as interface module 110 and/or processing module 120, and/or may include or be in communication with one or more language models such as LLM 20 and/or SLM 130. In the example of FIG. 1, SLM 130 is a module of system 100, but in other embodiments, SLM 130 may be separate from, and in communication with, system 100. As a specific example not necessarily limiting to all embodiments, SLM 130 may be Mistral Small or Mistral Tiny, and LLM 20 may be GPT 4.0. The elements of system 100 are described in greater detail below with respect to FIGS. 2-3, but in general, system 100 can process client 10 queries using a combination of LLM 20 and SLM 130.

Illustrated components may include a variety of hardware, firmware, and/or software components that may interact with one another. Some components shown in FIG. 1 may communicate with one another using networks. For example, system 100 may communicate with client 10 and/or LLM 20 (and SLM 130 in some embodiments) through one or more networks (e.g., the Internet, an intranet, and/or one or more networks that provide a cloud environment). In some embodiments, elements of system 100 may communicate with one another through the one or more networks. Each component may be implemented by one or more computers (e.g., as described below with respect to FIG. 4).

Elements illustrated in FIG. 1 (e.g., system 100 (including interface module 110, processing module 120, and SLM 130), client 10, and LLM 20) are each depicted as single blocks for ease of illustration, but those of ordinary skill in the art will appreciate that these may be embodied in different forms for different implementations. For example, while separate modules of system 100 are depicted separately, any combination of these elements may be part of a combined hardware, firmware, and/or software element. Moreover, while the modules are depicted as parts of a single system 100 element, any combination of these elements may be distributed among multiple logical and/or physical locations. Also, while one client 10, one LLM 20, one system 100, one interface module 110, one processing module 120, and one SLM 130 are illustrated, this is for clarity only, and multiples of any of the above elements may be present. In practice, there may be single instances or multiples of any of the illustrated elements, and/or these elements may be combined or co-located. For example, a plurality of clients 10 may send prompts to system 100. In another example, system 100 may communicate with and/or incorporate multiple LLMs 20 and/or SLMs 130.

In the following descriptions of how the illustrated components function, several examples are presented. However, those of ordinary skill in the art will appreciate that these examples are merely for illustration, and the disclosed embodiments are extendable to other application and data contexts.

Figure 2:
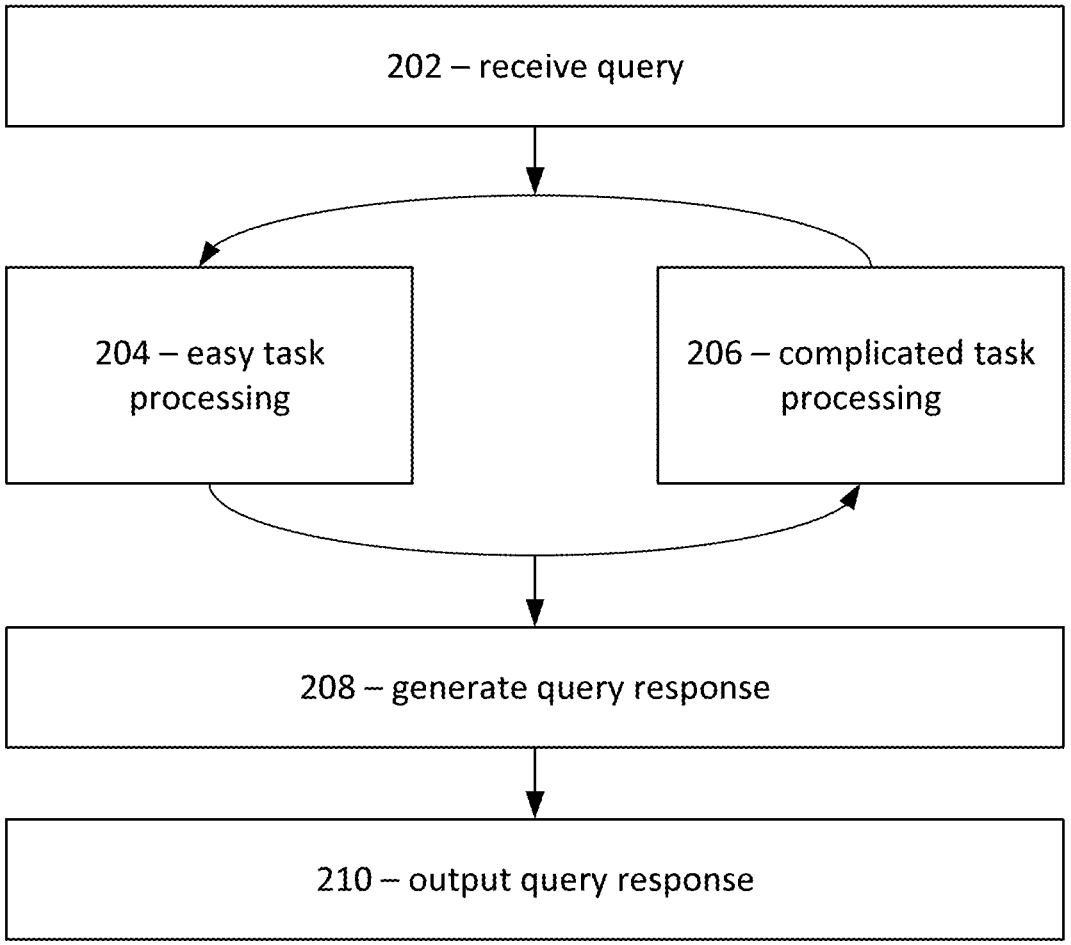
FIG. 2 shows an example multi-model query response process according to some embodiments of the disclosure.

FIG. 2 shows an example multi-model query response process 200 according to some embodiments of the disclosure. System 100 may perform process 200 to respond to queries using both LLM 20 and SLM 130 in a manner that can reduce the number of tokens sent to and/or received from LLM 20. Reducing the number of tokens can reduce cost, reduce latency, and reduce bandwidth usage. System 100 can separate the overall query response generation into multiple tasks, where some tasks may be easy tasks and some tasks may be complicated tasks. Process 200 shows a general case that may be applicable to any such division of tasks.

At 202, system 100 can receive a query. For example, client 10 may be configured to present a user interface (UI) to a user. The UI can include one or more elements configured to receive user queries, which may be text or spoken queries. For example, a user may be performing a computing task and may be able to ask a chat bot for help with the computing task. In some embodiments, the UI may be generated locally by client 10 itself. In some embodiments, interface module 110 may provide some or all of the UI (e.g., which may include the one or more elements configured to receive user queries), for example through a website or app hosted by system 100 and available to client 10 through the Internet or another network. In any event, a user of client 10 may input a query, and interface module 110 may receive the query.

It may be possible to process the query by sending the entire query to LLM 20 and allowing LLM 20 to generate a complete answer to the query. However, a large number of tokens may be required to send the entire query, along with additional instructions for responding to the query, to LLM 20. Also, if LLM 20 generates a detailed response, a large number of tokens may be required to deliver the response. Thus, as an alternative to sending the entire query to LLM 20, the query may be divided into tasks, only some of which may be handled by LLM 20. For example, the query may comprise at least one easy task and at least one complicated task, where an easy task is a task that can be performed without LLM 20 (e.g., using SLM 130, as described below, or otherwise), and a complicated task is a task that can be given to LLM 20 for processing. In some embodiments, processing module 120 can define one or more easy tasks and one or more complicated tasks.

At 204, system 100 can process an easy task. For example, processing module 120 can generate a prompt and input the prompt and at least a portion of the query to SLM 130. SLM 130 can perform processing as directed by the prompt and return an SLM processing result. In cases where there are multiple easy tasks, processing module 120 can generate multiple prompts, directing multiple processing rounds by SLM 130, and receiving multiple SLM processing results. For example, as described in detail below with reference to FIG. 3, the at least one easy task may comprise at least one of a query topic determination, a required information extraction, and a short response extension.

At 206, system 100 can process the at least one complicated task. For example, processing module 120 can generate a prompt and input the prompt and at least a portion of the query to LLM 20. LLM 20 can perform processing as directed by the prompt and return an LLM processing result. In cases where there are multiple complicated tasks, processing module 120 can generate multiple prompts, directing multiple processing rounds by LLM 20, and receiving multiple LLM processing results. For example, as described in detail below with reference to FIG. 3, the at least one complicated task may comprise at least one of a required information determination and a short response generation.

As suggested by FIG. 2, some tasks may depend on one another. For example, system 100 can process an easy task and provide at least a portion of an SLM processing result as part of the input to LLM 20 for processing a complicated task. In such cases, the processing of the at least one complicated task may comprise processing at least a portion of the at least one SLM processing result using LLM 20.

Likewise, system 100 can process a complicated task and provide at least a portion of an LLM processing result as part of the input to SLM 130 for processing an easy task. In such cases, the processing of the at least one easy task may comprise processing at least a portion of the at least one LLM processing result using SLM 130.

For example, processing module 120 may process a first of the at least one easy tasks using SLM 130, thereby obtaining a first of the at least one SLM processing results. Processing module 120 may next process a complicated task using the first of the at least one SLM processing results as at least a portion of an input to LLM 20, thereby obtaining an LLM processing result that incorporates at least a portion of the first of the at least one SLM processing results. Finally, processing module 120 may process a second of the at least one easy tasks using the one at least one LLM processing result as at least a portion of an input to SLM 130, thereby obtaining a second of the at least one SLM processing results that incorporates at least a portion of the one at least one LLM processing result. Another example of a processing workflow where some of the tasks are dependent upon completion of previous tasks is given below with reference to FIG. 3.

It should be understood that system 100 can be configured to perform any number and any combination of easy tasks and complicated tasks in any order, and tasks may be dependent upon a previous task or multiple previous tasks or may be independent. Accordingly, processing at 204 and/or 206 may be repeated, combined, or reordered as required to complete all tasks.

At 208, system 100 can generate a query response. The query response can comprise at least a portion of the SLM processing result(s) and/or at least a portion of the LLM processing result(s) from the one or more instances of processing at 204 and 206 as described above. In some embodiments, the query response can be the final SLM processing result or LLM processing result obtained, or a portion thereof (e.g., with reference to the previous example, wherein the query response may comprise the second of the at least one SLM processing results).

In some embodiments, the query response may be a result of performing a sequence comprising the processing of the at least one easy task and the processing of the at least one complicated task in a predetermined order such that the query response may depend upon and thus, directly or indirectly, comprise at least a portion of the SLM processing result(s) and/or at least a portion of the LLM processing result(s) from the one or more instances of processing at 204 and 206.

In some embodiments, the query response can include a combination of at least a portion of the SLM processing result(s) and/or at least a portion of the LLM processing result(s) from the one or more instances of processing at 204 and 206 prepared by processing module 120.

At 210, system 100 can output the query response. For example, interface module 110 can cause client 10 to display or present the query response in the UI as a text, graphical, and/or audio UI element.

Figure 3:
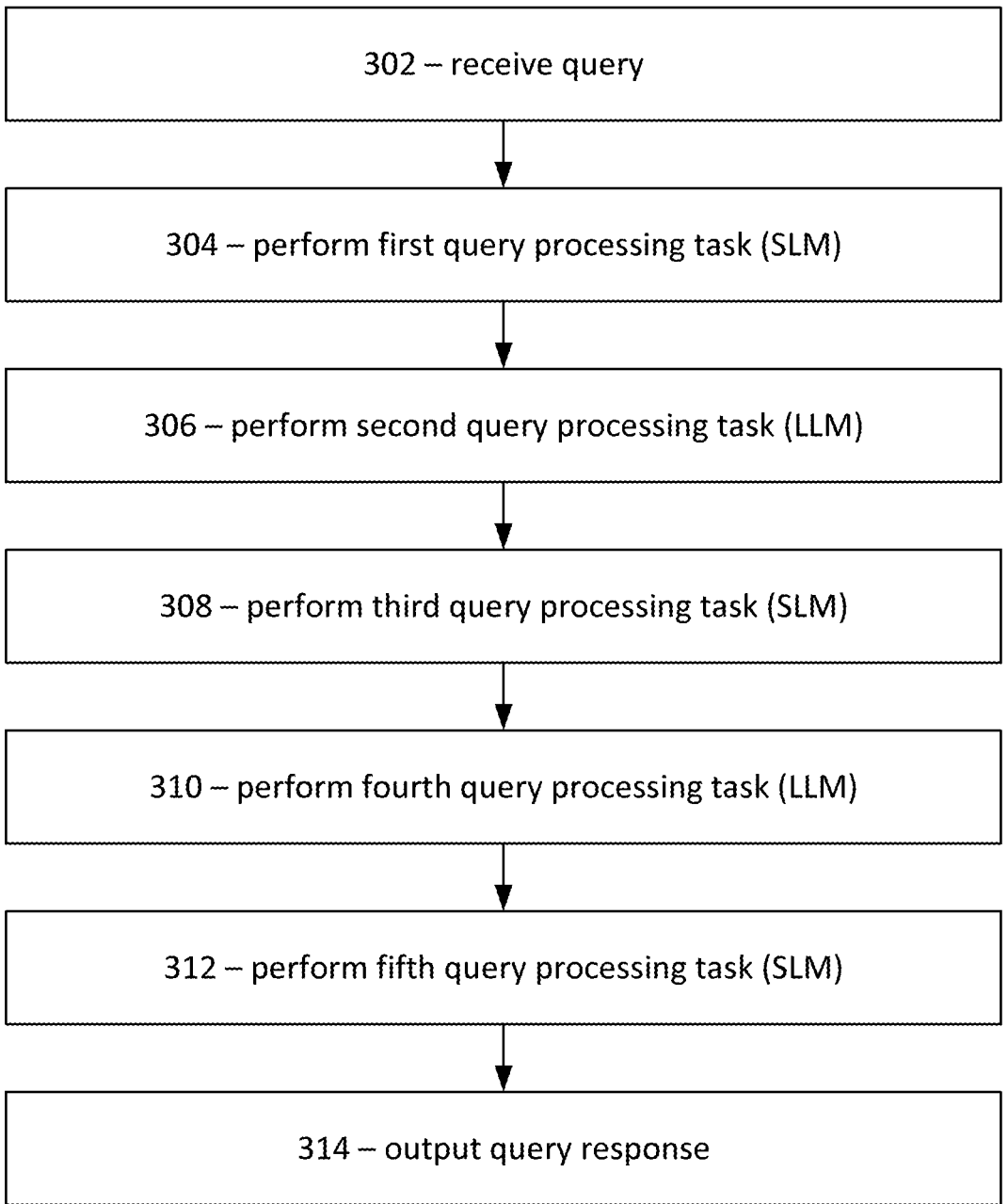
FIG. 3 shows an example token saving process according to some embodiments of the disclosure.

FIG. 3 shows an example token saving process 300 according to some embodiments of the disclosure. System 100 may perform process 300 to respond to queries using both LLM 20 and SLM 130 in a manner that can reduce the number of tokens sent to and/or received from LLM 20. In the example of process 300, some of the LLM 20 and SLM 130 processing depends on the results of previous LLM 20 and/or SLM 130 processing in a way that may optimize token exchange with LLM 20 while leveraging the advantages that LLM 20 can provide over SLM 130.

At 302, system 100 can receive a query. For example, client 10 may be configured to present a UI to a user. The UI can include one or more elements configured to receive user queries, which may be text or spoken queries. In some embodiments, the UI may be generated locally by client 10 itself. In some embodiments, interface module 110 may provide some or all of the UI (e.g., which may include the one or more elements configured to receive user queries), for example through a website or app hosted by system 100 and available to client 10 through the Internet or another network. In any event, a user of client 10 may input a query, and interface module 110 may receive the query. As discussed above, instead of sending the entire query to LLM 20, the query may be divided into a plurality of tasks, only some of which may be handled by LLM 20. For example, the query may comprise at least one easy task and at least one complicated task. In some embodiments, processing module 120 can define one or more easy tasks and one or more complicated tasks.

For example, a user may be performing a computing task and may be able to ask a chat bot for help with the computing task. To demonstrate process 300, the computing task may be using a personal finance app or web interface. The user may ask a question such as "here is my financial history [FINANCIAL HISTORY], what can I do to improve my credit score?" where [FINANCIAL HISTORY] may include an attachment, link, reference, or text input including a financial history record.

At 304, system 100 can perform a first query processing task of the plurality of tasks using SLM 130. For example, processing module 120 can provide at least a portion of the query and a first instruction to SLM 130, thereby obtaining a first intermediate processing result.

In some embodiments, the first query processing task may comprise a query topic determination. Processing module 120 may instruct SLM 130 to determine the topic of the query and/or determine what information is in the query. For example, processing module 120 can prompt SLM 130 with the query (e.g., "here is my financial history [FINANCIAL HISTORY], what can I do to improve my credit score?") and an instruction to identify a primary topic or primary concern evinced by the query and a summary of the information that has been shared. SLM 130 can return a first intermediate processing result indicating that the primary topic is "credit score advice" while the information provided is "financial history," for example. The following is an example prompt that processing module 120 may give to SLM 130:

Your task is to determine the primary subject of the query and provide a concise summary of the information presented. For example, given the query: "This is my financial history for the last 3 years {financial history}, what steps should I take to enhance my credit score?"

The response should look like this: {'topic': 'credit score improvement advice', 'given information': 'three-year financial history'}

At 306, system 100 can perform a second query processing task of the plurality of tasks using LLM 20. For example, processing module 120 can provide at least a portion of the first intermediate processing result and a second instruction to LLM 20, thereby obtaining a second intermediate processing result.

In some embodiments, the second query processing task may comprise a required information determination. Processing module 120 may instruct LLM 20 to determine the specific details required to address the primary topic of the query. Continuing the credit score advice example, processing module 120 can prompt LLM 20 with the primary topic ("credit score advice") and information provided ("financial history") from the first intermediate processing result along with an instruction to identify specific information that may be required to address the primary topic using the information provided. For example, LLM 20 can return a second intermediate processing result indicating that specific pieces of information are required, such as the user's total income and outcome, debts, the number of loans taken, and how many of them were repaid on time, among others. The following is an example prompt that processing module 120 may give to LLM 20:

Your task is to identify specific information required to resolve the issue presented. Be precise yet succinct in your response. For instance, given the topic: 'credit score improvement advice' with a 'three-year financial history' presented, the response should be structured as follows:

['total income', 'total expenses', 'outstanding debts', 'number of loans taken', 'number of loans repaid on time']

At 308, system 100 can perform a third query processing task of the plurality of tasks using SLM 130. For example, processing module 120 can provide at least a portion of the second intermediate processing result and a third instruction to SLM 130, thereby obtaining a third intermediate processing result.

In some embodiments, the third query processing task may comprise a required information extraction. Processing module 120 may instruct SLM 130 to provide a summary of the input query. For example, processing module 120 can prompt SLM 130 with the original query and the information required to address the primary topic given by the second intermediate processing result along with an instruction to extract the information required to address the primary topic. Continuing the example, a user may furnish the chatbot with a considerable amount of details about his expenses, such as "$2,000 for rent, $500 for bills, $1,000 for childcare, $800 for debts," and so on. SLM 130 can summarize the information by providing a total expenditure of "$4,300" as the third intermediate processing result. The following is an example prompt that processing module 120 may give to SLM 130:

Your task is to summarize the provided query and consider the essential information needed for a resolution. For instance, given the query: "2024 expenses: $2,000 for rent, $500 for bills, $1,000 for childcare, $800 for debts" and when the necessary inputs are:

['expenses', 'debts'],

Your response should be: {'expenses': 4300, 'debts': 800}

At 310, system 100 can perform a fourth query processing task of the plurality of tasks using LLM 20. For example, processing module 120 can provide at least a portion of the third intermediate processing result and a fourth instruction to LLM 20, thereby obtaining a fourth intermediate processing result.

In some embodiments, the fourth query processing task may comprise a short response generation. Processing module 120 may instruct LLM 20 to generate a succinct and to-the-point response to the user's query. For example, processing module 120 can prompt LLM 20 with the primary topic as determined above and the required information extracted as the third intermediate processing result, which may be smaller than the original information from the original query, along with an instruction to provide a very concise response addressing the primary topic in view of the required information. The goal is a concise response, as generating output tokens can be expensive and slow, particularly for commercial models. LLM 20 may act as the "brain," an expert that stores vast training data and has the capability to provide a reasonable response. LLM 20 can return a concise answer as the fourth intermediate processing result. The following is an example prompt that processing module 120 may give to LLM 20:

Your task is to address a specific topic or issue based on provided information. For example, given the topic 'credit score improvement advice' with information such as {'expenses': 4300, 'debts': 800}, an appropriate response could be: 'reduce the debt-to-expense ratio.'

At 312, system 100 can perform a fifth query processing task of the plurality of tasks using SLM 130. For example, processing module 120 can provide at least a portion of the fourth intermediate processing result and a fifth instruction to SLM 130, thereby obtaining a query response.

In some embodiments, the fifth query processing task may comprise a short response extension. As the goal is to offer users a comprehensive and informative response, processing module 120 may instruct SLM 130 to enhance the short response obtained as the fourth intermediate processing result. For example, processing module 120 can prompt SLM 130 with the user's original query and the concise response from the fourth intermediate processing result along with an instruction to provide additional details for the response. SLM 130 can use the specific information obtained from the original user query to enhance the response provided by LLM 20. For example, following the earlier illustration, LLM 20 may have detected that expenses generally may have adversely affected the user's credit score. In turn, SLM 130 can extract specific instances from the original user query and provide those as evidence to further enrich the response. This enriched response may be the query response. The following is an example prompt that processing module 120 may give to SLM 130: Your task is to expand on a given response by taking into account specific provided information. For example, if the initial response is 'reduce the debt-to-expense ratio,' and you have the detailed data "2024 expenses: $2,000 for rent, $500 for bills, $1,000 for childcare, $800 for debts,"

The extended response could be: "Reviewing the 2024 financial details, several large fixed expenses are noted, such as $2,000 for rent, $500 for bills, and $1,000 for childcare. To improve your credit score, focus on reducing the debt-to-expense ratio. Consider strategies for minimizing or restructuring the $800 in debts."

At 314, system 100 can output a query response. For example, interface module 110 can cause client 10 to display or present the query response as generated at 312, or a portion thereof, in the UI as a text, graphical, and/or audio UI element.

Figure 4:
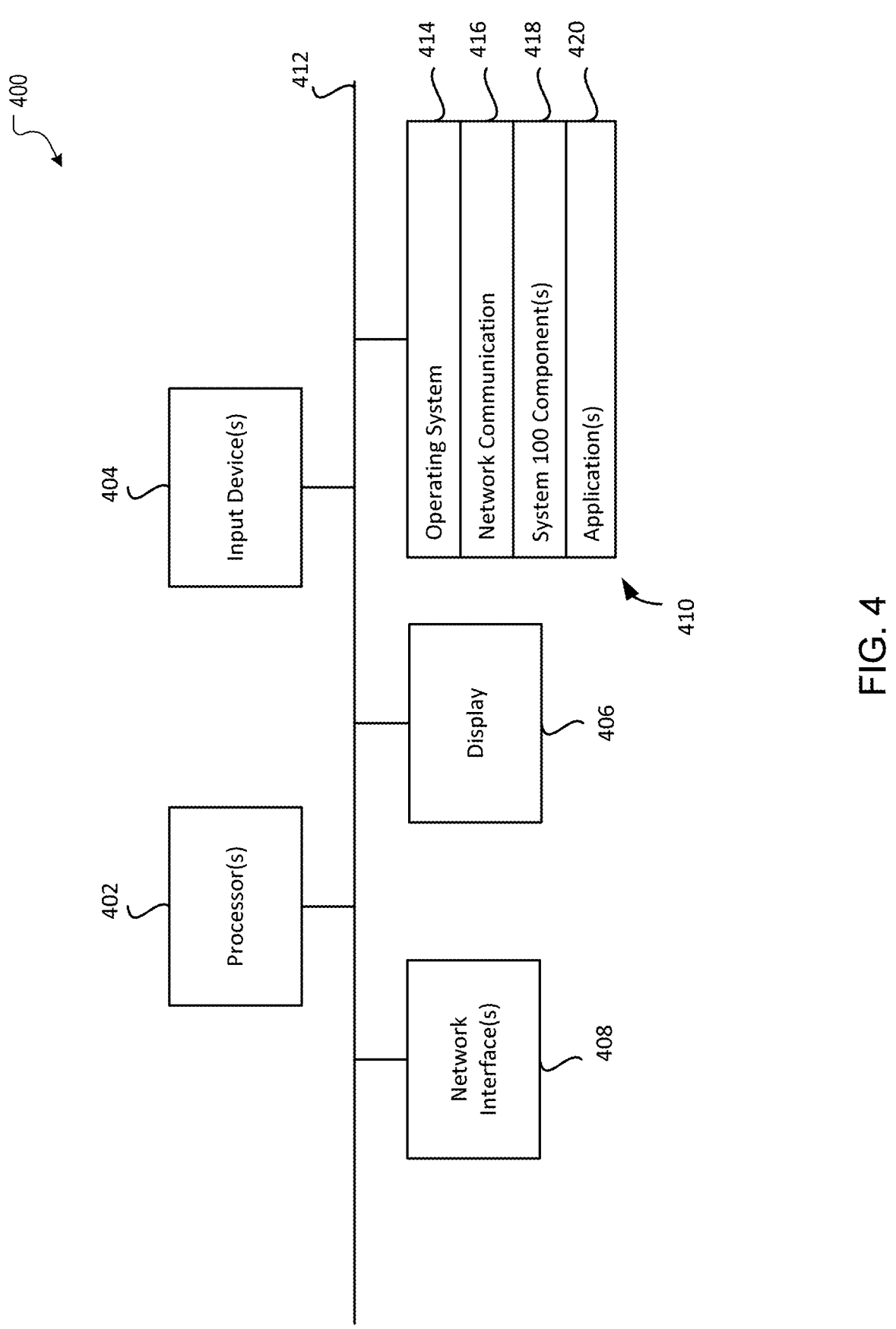
FIG. 4 shows an example computing device according to some embodiments of the disclosure.

FIG. 4 shows a computing device 400 according to some embodiments of the disclosure. For example, computing device 400 may function as system 100 and/or any portion(s) thereof, or multiple computing devices 400 may function as system 100 and/or any portion(s) thereof.

Computing device 400 may be implemented on any electronic device that runs software applications derived from compiled instructions, including without limitation personal computers, servers, smart phones, media players, electronic tablets, game consoles, email devices, etc. In some implementations, computing device 400 may include one or more processors 402, one or more input devices 404, one or more display devices 406, one or more network interfaces 408, and one or more computer-readable mediums 410. Each of these components may be coupled by bus 412, and in some embodiments, these components may be distributed among multiple physical locations and coupled by a network.

Display device 406 may be any known display technology, including but not limited to display devices using Liquid Crystal Display (LCD) or Light Emitting Diode (LED) technology. Processor(s) 402 may use any known processor technology, including but not limited to graphics processors and multi-core processors. Input device 404 may be any known input device technology, including but not limited to a keyboard (including a virtual keyboard), mouse, track ball, and touch-sensitive pad or display. Bus 412 may be any known internal or external bus technology, including but not limited to ISA, EISA, PCI, PCI Express, NuBus, USB, Serial ATA or FireWire. In some embodiments, some or all devices shown as coupled by bus 412 may not be coupled to one another by a physical bus, but by a network connection, for example. Computer-readable medium 410 may be any medium that participates in providing instructions to processor(s) 402 for execution, including without limitation, non-volatile storage media (e.g., optical disks, magnetic disks, flash drives, etc.), or volatile media (e.g., SDRAM, ROM, etc.).

Computer-readable medium 410 may include various instructions 414 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 404; sending output to display device 406; keeping track of files and directories on computer-readable medium 410; controlling peripheral devices (e.g., disk drives, printers, etc.) which can be controlled directly or through an I/O controller; and managing traffic on bus 412. Network communications instructions 416 may establish and maintain network connections (e.g., software for implementing communication protocols, such as TCP/IP, HTTP, Ethernet, telephony, etc.).

System 100 components 418 may include instructions for performing the processing described herein. For example, system 100 components 418 may provide instructions for performing processes 200 and/or 300 and/or other processing as described above and may include SLM 130 in some embodiments. Application(s) 420 may be an application that uses or implements the outcome of processes described herein and/or other processes. In some embodiments, the various processes may also be implemented in operating system 414.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, "prompt engineering" to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:

receiving, by at least one processor, a query, wherein processing the query comprises at least a first easy task, a complicated task, and a second easy task;

processing, by the at least one processor, the first easy task using a small language model (SLM), thereby obtaining a first SLM processing result;

processing, by the at least one processor, the complicated task using a large language model (LLM), the processing of the complicated task comprising inputting the first SLM processing result to the LLM and processing the first SLM processing result using the LLM, thereby obtaining an LLM processing result that incorporates at least a portion of the first SLM processing result;

processing, by the at least one processor, the second easy task using the SLM, the processing of the second easy task comprising inputting the LLM processing result to the SLM and processing the LLM processing result using the SLM, thereby obtaining a second SLM processing result that incorporates at least a portion of the LLM processing result;

generating, by the at least one processor, a query response comprising at least a portion of the the second SLM processing result; and outputting, by the at least one processor, the query response.

2. The method of claim 1, wherein the at least one easy task comprises at least one of a query topic determination, a required information extraction, and a short response extension.

3. The method of claim 1, wherein the complicated task comprises at least one of a required information determination and a short response generation.

4. The method of claim 1, wherein the query response is a result of performing a sequence comprising the processing of the at least one easy task and the processing of the complicated task in a predetermined order.

5. The method of claim 1, wherein the processing of the complicated task comprises processing at least a portion of the at least one SLM processing result using the LLM.

6. The method of claim 1, wherein the processing of the at least one easy task comprises processing at least a portion of the at least one LLM processing result using the SLM.

7. A system comprising:

at least one processor; and at least one non-transitory computer-readable medium storing instructions that, when executed by the at least one processor, cause the at least one processor to perform processing comprising:

receiving a query, wherein processing the query comprises at least a first easy task, a complicated task, and a second easy task;

processing the first easy task using a small language model (SLM), thereby obtaining a first SLM processing result;

processing the complicated task using a large language model (LLM), the processing of the complicated task comprising inputting the first SLM processing result to the LLM and processing the first SLM processing result using the LLM, thereby obtaining an LLM processing result that incorporates at least a portion of the first SLM processing result;

processing the second easy task using the SLM, the processing of the second easy task comprising inputting the LLM processing result to the SLM and processing the LLM processing result using the SLM, thereby obtaining a second SLM processing result that incorporates at least a portion of the LLM processing result;

generating a query response comprising at least a portion of the the second SLM processing result; and outputting the query response.

8. The system of claim 7, wherein the at least one easy task comprises at least one of a query topic determination, a required information extraction, and a short response extension.

9. The system of claim 7, wherein the complicated task comprises at least one of a required information determination and a short response generation.

10. The system of claim 7, wherein the query response is a result of performing a sequence comprising the processing of the at least one easy task and the processing of the complicated task in a predetermined order.

11. The system of claim 7, wherein the processing of the complicated task comprises processing at least a portion of the at least one SLM processing result using the LLM.

12. The system of claim 7, wherein the processing of the at least one easy task comprises processing at least a portion of the at least one LLM processing result using the SLM.

13. A method comprising:

receiving, by at least one processor, a query wherein processing the query comprises a plurality of tasks;

performing, by the at least one processor, a first of the plurality of tasks by providing at least a portion of the query and a first instruction to a small language model (SLM), thereby obtaining a first intermediate processing result;

performing, by the at least one processor, a second of the plurality of tasks by providing at least a portion of the first intermediate processing result and a second instruction to a large language model (LLM), thereby obtaining a second intermediate processing result;

performing, by the at least one processor, a third of the plurality of tasks by providing at least a portion of the second intermediate processing result and a third instruction to the SLM, thereby obtaining a third intermediate processing result;

performing, by the at least one processor, a fourth of the plurality of tasks by providing at least a portion of the third intermediate processing result and a fourth instruction to the LLM, thereby obtaining a fourth intermediate processing result;

performing, by the at least one processor, a fifth of the plurality of tasks by providing at least a portion of the fourth intermediate processing result and a fifth instruction to the SLM, thereby obtaining a query response; and outputting, by the at least one processor, the query response.

14. The method of claim 13, wherein the first of the plurality of tasks comprises a query topic determination.

15. The method of claim 13, wherein the second of the plurality of tasks comprises a required information determination.

16. The method of claim 13, wherein the third of the plurality of tasks comprises a required information extraction.

17. The method of claim 13, wherein the fourth of the plurality of tasks comprises a short response generation.

18. The method of claim 13, wherein the fifth of the plurality of tasks comprises a short response extension.

* * * * *